United States Patent
Fiedler

(10) Patent No.: US 9,820,618 B1
(45) Date of Patent: Nov. 21, 2017

(54) ARTICLE AND METHOD FOR FACILITATING AND ENCOURAGING PROPER DISPOSAL OF COOKING OILS

(71) Applicant: SALFIE Products, LLC, McGregor, TX (US)

(72) Inventor: Louis K. Fiedler, Waco, TX (US)

(73) Assignee: SALFIE Products, LLC, McGregor, TX (US)

( * ) Notice: Subject to any disclaimer, the term of this patent is extended or adjusted under 35 U.S.C. 154(b) by 424 days.

(21) Appl. No.: 14/553,797

(22) Filed: Nov. 25, 2014

(51) Int. Cl.
*A47J 37/12* (2006.01)
*A47J 47/16* (2006.01)
*A47J 47/18* (2006.01)
*B01D 35/02* (2006.01)
*B01D 35/027* (2006.01)

(52) U.S. Cl.
CPC .......... *A47J 47/18* (2013.01); *A47J 37/1271* (2013.01); *A47J 47/16* (2013.01); *B01D 35/027* (2013.01)

(58) Field of Classification Search
CPC ........ A47J 37/1271; A47J 47/16; A47J 47/18; B01D 35/02; B01D 35/027; B01D 35/153; B01D 2201/04; B01D 2201/0415; B01D 2201/0423; B01D 2201/10; B01D 2201/16; B01D 2201/167; B66C 11/02; B67D 3/0096; B67D 3/0051; B67D 3/0083
USPC ......... D7/369, 519, 571–573, 578, 601, 628, D7/667; D23/200, 209, 237, 249, D23/259–261; D9/601, 607; D21/596; 99/444, 446, 646, 646 R, 646 C, 646 LS; 206/457; 210/464, 469, 473–475, 477, 210/482; 220/571, 23.87, 495.06, 910, 220/446, 571.1, 572, 573; 141/340–343; 211/41.3, 41.5, 41.6
See application file for complete search history.

(56) References Cited

U.S. PATENT DOCUMENTS

| | | | | |
|---|---|---|---|---|
| 2,247,040 A * | 6/1941 | Whitsett | ............. | A47J 37/1223 210/238 |
| 3,184,100 A * | 5/1965 | Thomas | ............. | B65F 1/06 220/495.08 |
| 5,979,516 A * | 11/1999 | Grant | ............. | F01M 11/0408 141/114 |
| 6,355,168 B1 * | 3/2002 | White | ............. | A47J 37/1285 210/236 |
| 7,137,419 B1 * | 11/2006 | Reeves | ............. | B01D 29/085 141/340 |
| 8,016,150 B1 * | 9/2011 | Bunch | ............. | A47J 37/1271 220/23.87 |

(Continued)

Primary Examiner — Joseph Drodge
(74) Attorney, Agent, or Firm — Wayne J. Colton, Inc.

(57) ABSTRACT

An article for facilitating and encouraging proper disposal of cooking oils includes an aesthetic body shaped in the appearance of at least a portion of a monkey having at least an open mouth; a mount for attaching the aesthetic body to a portion of a waste receptacle; a funnel disposed substantially within the open mouth of the monkey and leading to a cooking oil conduit, which is disposed substantially within the interior space of the aesthetic body and is provided at its distal end with internal threading that is sized and shaped to accept and dependently support a container for collecting cooking oil. At least one stabilizing means for holding a frying pan, skillet, sauce pot or the like in place about the open mouth of the monkey is provided. A solids screen and an air conduit ensure rapid and unimpeded flow through the conduit of cooking oil.

20 Claims, 8 Drawing Sheets

(56) References Cited

U.S. PATENT DOCUMENTS

| | | | | |
|---|---|---|---|---|
| 2009/0317023 A1* | 12/2009 | Baker | .................... | A47J 47/18 383/84 |
| 2013/0200089 A1* | 8/2013 | Vidal | .................... | B23P 11/00 220/739 |
| 2014/0202910 A1* | 7/2014 | Hollander | .............. | B65D 81/36 206/457 |
| 2014/0374300 A1* | 12/2014 | Espinosa | ................ | B65F 1/163 206/457 |

* cited by examiner

ARTICLE AND METHOD FOR FACILITATING AND ENCOURAGING PROPER DISPOSAL OF COOKING OILS

FIELD OF THE INVENTION

The present invention relates to environmental protection and public health improvement. More particularly, the invention relates to an article of manufacture, and related method for its use, for both facilitating and encouraging the proper disposal of cooking oil and grease.

BACKGROUND OF THE INVENTION

It has long been known that municipal sewer systems cannot handle cooking oil and grease and that these wastes should never be discarded down kitchen drains. To be sure, when disposed down a drain, fats, oils and grease congeal and stick to the sewer pipes in a manner that has been compared to the way bad cholesterol can clog heart arteries. Eventually, the grease, fat and oil will clog the sewer lines, causing sewage back-ups and flooding, which in turn result in damage to both personal and public property. Notwithstanding this longstanding knowledge, however, cooking grease being poured down drains persists as a major cause of residential sewer main clogs. In fact, it is historically observed that some 75 percent of sanitary sewer overflows in a typical municipality are attributable to grease and debris.

When such an obstruction blocks the flow of wastewater within a sewer pipe, the wastewater may back up and overflow through a manhole, cleanout, toilet, sink or drain. In addition to being unsightly and smelly, sewer spills are also unhealthy. Because sanitary sewer overflows contain everything that goes down any drain in the neighborhood, they can and often do carry harmful bacteria, viruses and various diseases, which is especially disconcerting for children, the elderly and people with compromised immune systems, all of whom face added risks. Still further, however, this problem is also environmental. For example, in water bodies the environmental impacts of sewage include hypoxia, algal blooms, habitat degradation, floating debris and aquatic species die-offs.

Given the frequency of cooking oil and grease caused sewer overflows, and the wide range and severe magnitude of the potential consequences, it is critical that everything possible should be done to prevent them. Unfortunately, the typical approach to the problem has heretofore been limited to public awareness campaigns advising residential dwellers that small amounts of cooking oils such as frying oil and bacon fat should be poured into an empty milk carton, frozen juice container or other package and disposed of in the garbage as opposed to being poured into a drain. Given the statistical evidence, however, this approach is clearly woefully inadequate.

With the shortcomings of the prior art clearly in mind, it is therefore an overriding object of the present invention to improve over the prior art by introducing an article, and method for use of the article, that is particularly adapted to not only encourage good practice, but also to serve as an unmistakable reminder to adhere to good practice. Additionally, it is an object of the present invention to provide such an article that is economical to manufacture, thereby making the article suitable for purchase by those of any economic means as well as suitable for free distribution by municipalities or like stakeholders in connection with public awareness campaigns or the like. Finally, it is an object of the present invention to meet the foregoing and other objects by providing such an article that injects a measure of fun and humor into the grease disposal process, thereby doubly ensuring that the present invention will have a positive impact toward finally addressing the identified longstanding but heretofore unfulfilled need in the art, thereby bettering the environment while also improving the public health.

SUMMARY OF THE INVENTION

In accordance with the foregoing objects, the present invention—an article for facilitating and encouraging proper disposal of cooking oils—generally comprises an aesthetic body shaped in the appearance of at least a portion of a monkey. The aesthetic body comprises an interior space; at least one body orifice including at least an open mouth of the monkey; and a mount adapted to attach the aesthetic body to a portion of a waste receptacle. A funnel having an open mouth and a stem is disposed substantially within the open mouth of the monkey and a cooking oil conduit, which is disposed substantially within the interior space of the aesthetic body, is attached at one end to the stem of the funnel and provided at its other end with internal threading. The internal threading provided at the end of the cooking oil conduit is sized and shaped to accept and dependently support a container, which is adapted to collect cooking oil that, in use of the present invention, is passed through the cooking oil conduit as a cooking implement (defined herein to include all manner of frying pans, skillets, sauce pots and the like) is supported in place about the open mouth of the monkey. To this end, the article also comprises at least one stabilizing means adapted to hold the cooking implement in place about the open mouth of the monkey.

In at least one implementation of the article of the present invention, the aesthetic body includes a plurality of body orifices, wherein at least one of the provided body orifices comprises an open mouth of the monkey and at least one other of the provided body orifices comprises an anus of the monkey. In these implementations, the second end of the cooking oil conduit terminates at the anus of the monkey.

In at least one other implementation of the article of the present invention, the second end of the cooking oil conduit terminates at a location within the interior space of the aesthetic body and the interior space of the aesthetic body is sized and shaped to accept at least a portion of a container dependently supported from the second end of the cooking oil conduit. In these implementations, the aesthetic body also comprises an opening to the interior space, which opening is adapted to receive therethrough the portion of a container.

In any implementation of the article of the present invention, the provided stabilizing means for holding a cooking implement in place about the mouth of the monkey may comprise notches formed about the open mouth of the monkey, hands of the monkey formed as part of the aesthetic body and configured to grip or otherwise engage a portion of a cooking implement or any substantially equivalent means or any combination thereof.

Additionally, any implementation of the article of the present invention may further comprise an air conduit running from a first location above the mouth of the funnel to a second location below the second end of the cooking oil conduit. In this manner, as cooking oil flows through the conduit, a clear passage is provided for the escape from the container of air, thereby ensuring that flow of cooking oil through the conduit and into the container is as rapid and unimpeded as possible. As will be appreciated in light of this exemplary description, this provision serves to ensure that the flowing cooking oil makes its way into the container before it cools and possibly congeals and obstructs the cooking oil conduit.

Still further, any implementation of the article of the present invention may also, and preferably does, comprise a solids screen adapted to be received within the funnel, which also serves to ensure that solids do not become lodged within and possibly obstruct the cooking oil conduit. In the most preferred implementations, the solids screen and the air conduit are provided as a unitarily formed construct.

Still further yet, the mount adapted to attach the aesthetic body to a portion of a waste receptacle may, in any implementation of the article of the present invention, comprises one or more notches formed in a portion of the aesthetic body and sized and shaped to engage a portion of the waste receptacle such as, for example, the lip about the opening to the interior space of the receptacle.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Figure 1:
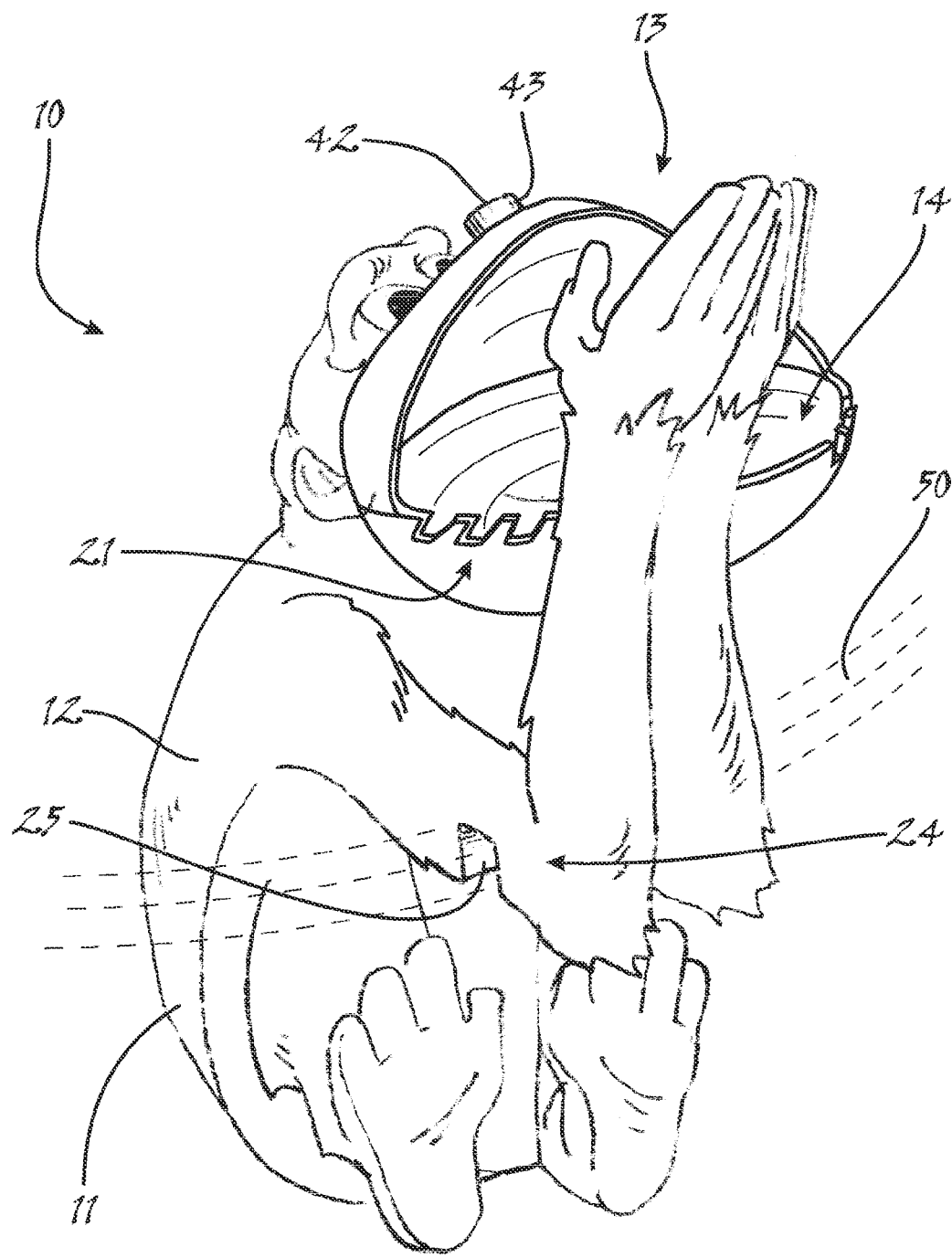
FIG. 1 shows, in a perspective view, a first exemplary implementation of the preferred embodiment of the article for facilitating and encouraging proper disposal of cooking oils of the present invention.

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Referring now to the figures, and to FIGS. 1 through 4 in particular, the article 10 for facilitating and encouraging proper disposal of cooking oils of the present invention generally comprises an aesthetic body 11, which includes an interior space 18 and is provided with at least one mount 24 for attachment of the aesthetic body 11 to a portion of a waste receptacle 47. As will be better understood further herein, and in a critical aspect of the present invention, the aesthetic body 11 is shaped in the appearance of at least a portion of a monkey 12, as the term "monkey" is defined in the controlling express definition set forth further herein under the subheading "Express Definitions" and which is intended to generally include animals that look like monkeys whether or not, in the strict sense, a particular implementation in fact actually characterizes a true monkey. In this manner, the article 10 of the present invention is particularly adapted not only for facilitating proper disposal of cooking oils, but also for encouraging proper disposal of cooking oils. In particular, implementation of the aesthetic body 11 in the form of a readily identifiable portion of a monkey 12 injects a sense of fun and humor into the best practice process for proper disposal of cooking oils, thereby serving as an unmistakable reminder for a user to adhere to good practice as well as encouraging good practice by rewarding the user with pleasure.

Figure 2:
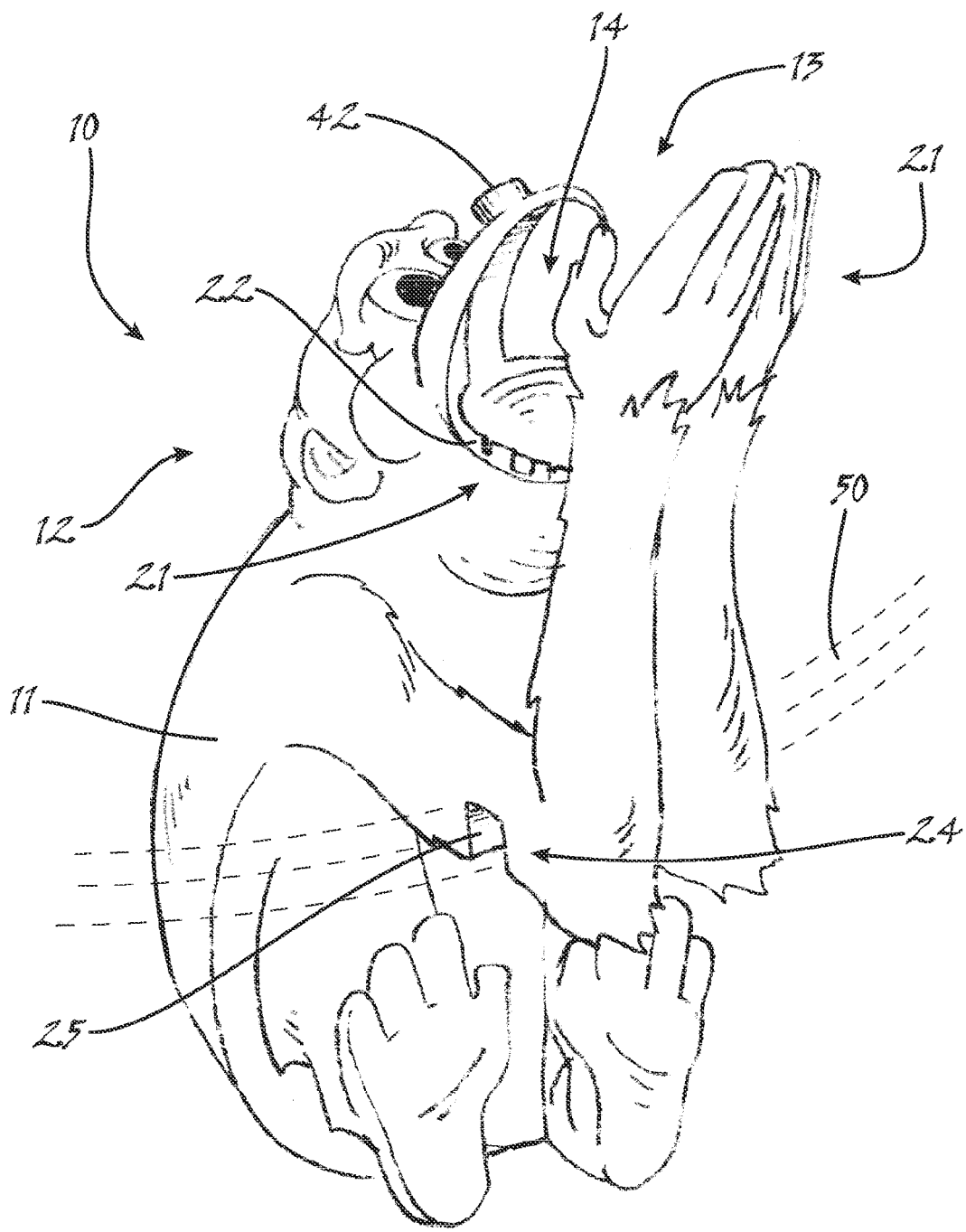
FIG. 2 shows, in a perspective view, a slight variation of the exemplary implementation of the preferred embodiment of the article for facilitating and encouraging proper disposal of cooking oils depicted in FIG. 1.
Figure 3:
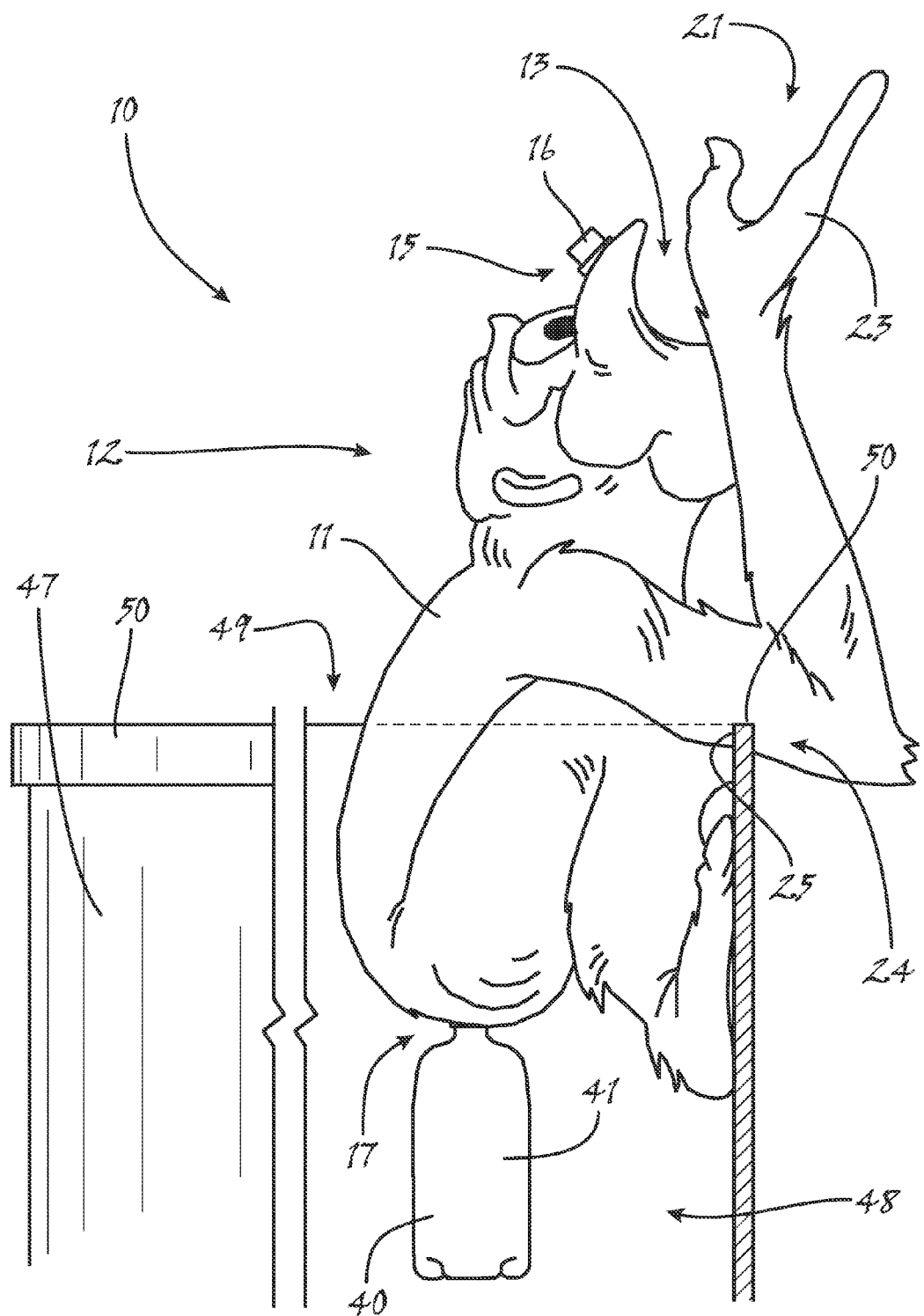
FIG. 3 shows, in a partially cutaway side elevational view, various details of the article for facilitating and encouraging proper disposal of cooking oils of FIG. 2, as operably mounted to a typical waste receptacle in preparation for use.

The aesthetic body 11, in the form of a monkey 12, is provided with one or more body orifices 13, which, in the most preferred implementations of the present invention, include at least an open mouth 14 for the monkey 12, as particularly shown in FIGS. 1 and 2. In any case, and in furtherance of the foregoing principle objects of the present invention, it is considered a critical aspect of the present invention that a funnel 26 is provided or otherwise formed within an implemented body orifice 13 of the monkey 12. As will be better understood further herein, the funnel 26, as implemented within a body orifice 13 of the monkey 12, is shaped, arranged and otherwise adapted to receive disposed cooking oil in a manner simulative of ingestion or the like by the monkey 12 of the disposed cooking oil. This, in turn, serves to further increase the satisfaction and pleasure to be expected from use of the present invention.

Figure 4:
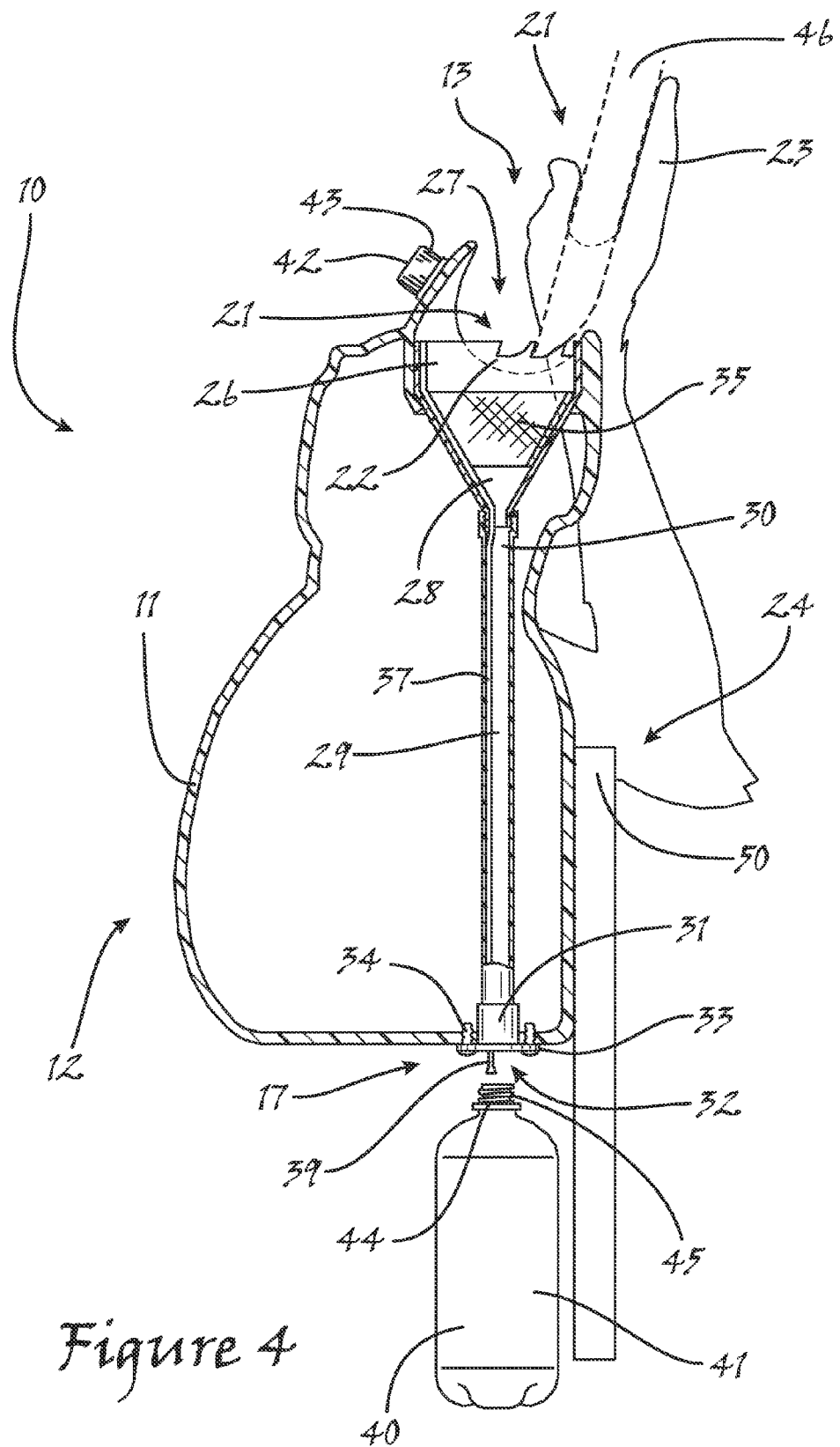
FIG. 4 shows, in a cross sectional view generally corresponding to that of FIG. 3, various additional details of the article for facilitating and encouraging proper disposal of cooking oils of FIG. 2, including, in particular, various details of the operable placement and stabilization of a cooking implement.

Referring now to FIG. 4, in particular, it is shown that the provided funnel 26, which generally comprises an open mouth 27 for receiving cooking oils and a stem 28 through which cooking oils may flow from the funnel 26, is operably connected in fluid communication with a cooking oil conduit 29 provided in the interior space 18 of the aesthetic body 11. In particular, as shown in the figure, the stem 28 of the funnel 26 is operably connected to the inlet 30 to the internally provided cooking oil conduit 29, which thus serves to convey disposed cooking oils through the interior space 18 of the aesthetic body 11 to a provided, preferably disposable, container 40. Because, in the most preferred implementations of the present invention, the container 40 comprises a plastic bottle 41, or the like, recycled or otherwise repurposed from other use, the outlet 31 from the cooking oil conduit 29 is most preferably provided with an internally threaded portion 32 having threading adapted to match the threading of the externally threaded portion 45 of the neck 44 of such a typical plastic bottle 41, which, as will be appreciated by those of ordinary skill in the art, will simply be the thread pattern as found in the internally threaded portion 43 of the bottle cap 42 conventionally provided for use with the plastic bottle 44.

Figure 7:
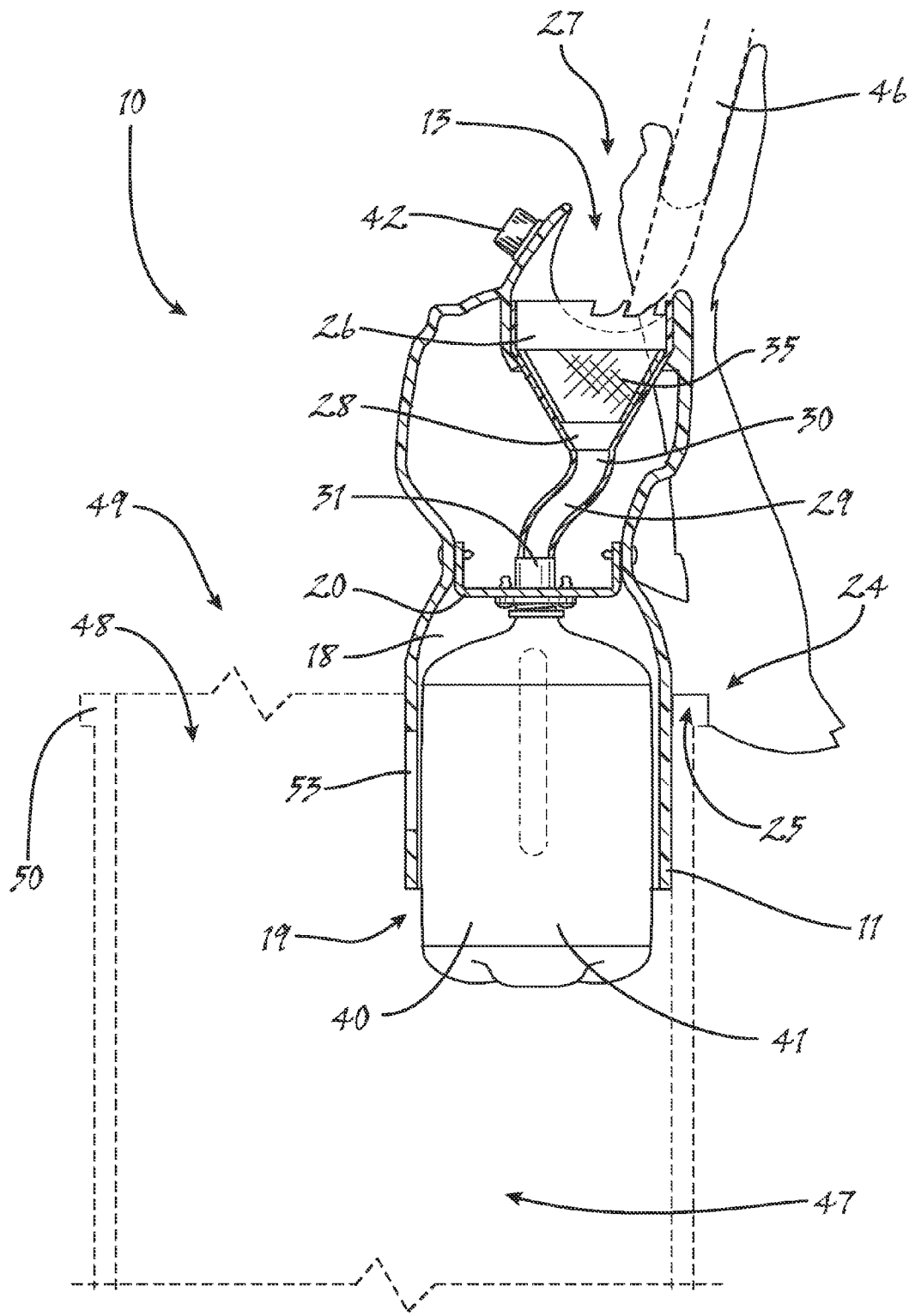
FIG. 7 shows, in a partially cutaway side elevational view generally corresponding to that of FIG. 3, a second exemplary implementation of the preferred embodiment of the article for facilitating and encouraging proper disposal of cooking oils of the present invention.

As also particularly shown in FIG. 4, the outlet 31 from the internal cooking oil conduit 29 may be arranged or otherwise positioned to simulate a further body orifice 13 of the monkey 12, such as, for example, an anus 17 of the monkey 12. On the other hand, however, it may in at least some embodiments be desirable to omit implementation of a further body orifice 13 in favor, for example, of concealing all or some portion of the container 40 within the interior space 18 of the aesthetic body 11, as particularly shown in FIG. 7. In the latter case, as also shown in FIG. 7, an opening 19, which may or may not be provided with an access door or the like, is provided for attachment and removal of the container 40. Likewise, a container mounting 20, which may comprise a plate or similar structure, may also be provided as dictated by the particular implementation and readily within the level of ordinary skill in the art. Additionally, as shown in FIG. 7, it is noted that in such an implementation as depicted the cooking oil conduit 29, if provided, may simply comprise an extended portion of the stem 28 of the funnel 26. Finally, a view slot 53 or like port is preferably provided in or through the aesthetic body 11 of such an implementation in order that a user of the article 10 may readily observe, through the provided view slot 53, the state of fill of the plastic bottle 41 or like container 40.

Figure 5:
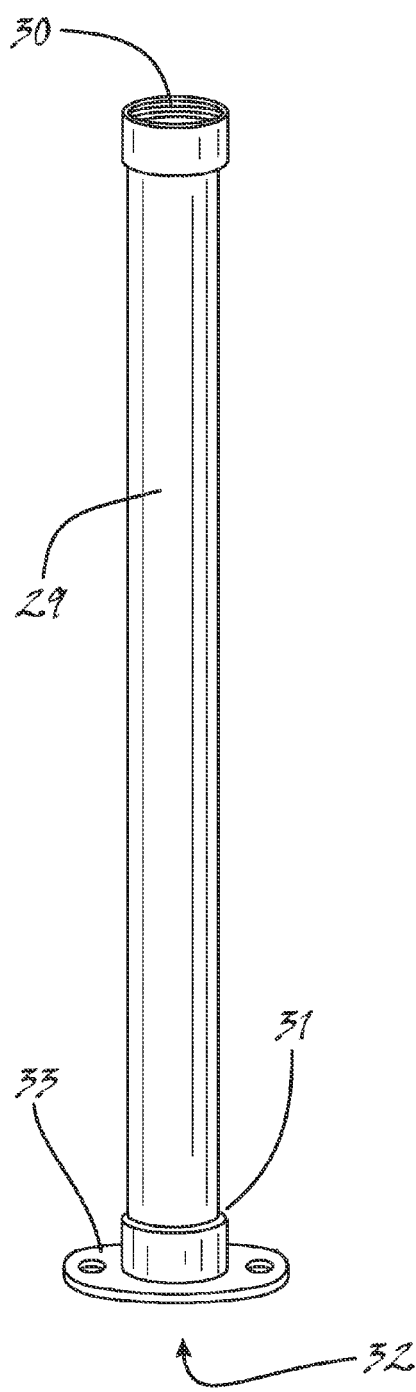
FIG. 5 shows, in a perspective view, details of the internal conduit as implemented in connection with the exemplary embodiment of FIG. 2.

Because in at least some implementations it is preferable that the internal cooking oil conduit 29 be accessible for cleaning, such as may be necessary in the event of clogging or obstruction or in order to prevent odors, the cooking oil conduit 29, as particularly shown in FIG. 5, may be provided with means for removal from the interior space 18 of the aesthetic body 11. Although those of ordinary skill in the art will recognize many substantially equivalent means, especially in light of this exemplary description, such a means may be implemented by the provision of a mounting fixture 33, such as the flange plate depicted in the figures, which may be attached to the aesthetic body 11 or, if provided, the container mounting 20. In any case, the mounting fixture 33 may be affixed in place with conventional mounting hardware 34, such as, for example, screws or the like.

Figure 6:
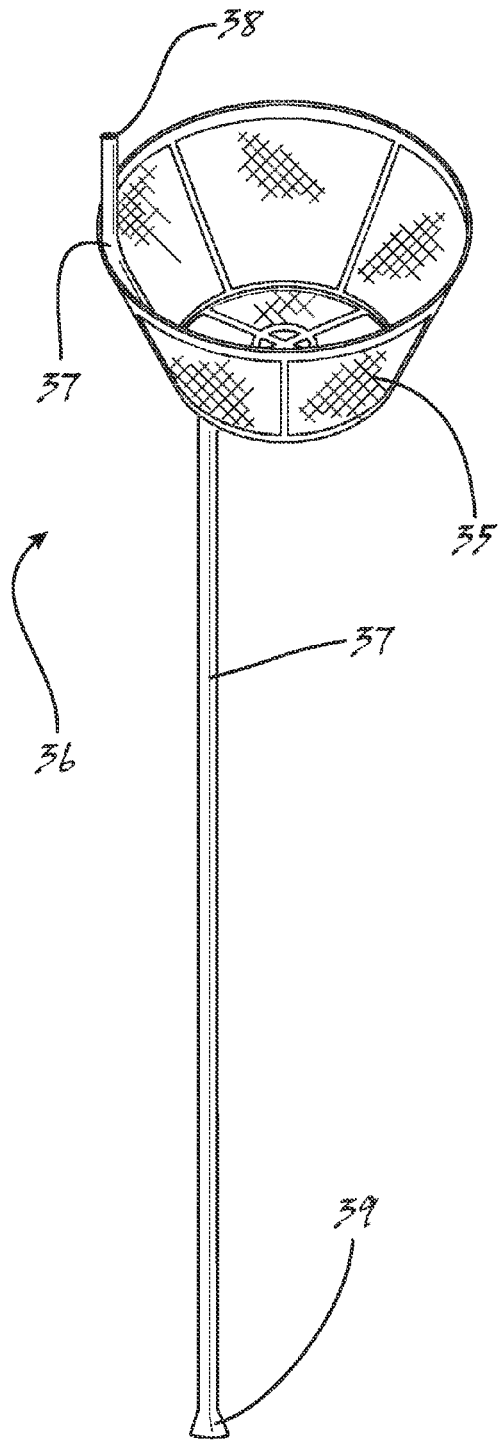
FIG. 6 shows, in a perspective view, details of the combination solids screen and air conduit as implemented in connection with the exemplary embodiment of FIG. 2.

In order to prevent clogging or obstruction of the cooking oil conduit 29, however, it is preferable that means be provided for preventing solids, such as, caramelized drippings or the like, from entering the cooking oil conduit 29 and/or for ensuring that the flowing cooking oil makes its way through the cooking oil conduit 29 and into the container 40 before the cooking oil cools and possibly congeals and obstructs the cooking oil conduit 29. As particularly shown in FIGS. 4 and 6, a first such means comprises the provision of a solids screen 35, which, as also shown in the figures, is sized, shaped and otherwise adapted to conform to the interior of the funnel 26 and, as will be appreciated by those of ordinary skill in the art, comprises a mesh structure suitable for readily passing cooking oils while substantially blocking undesired solids.

A second such means comprises the provision of an air conduit 37, which may be independently provided or which may be provided as part of a unitarily formed combination solids screen and air conduit 36. In either case, the air conduit 37 is arranged such that the inlet 38 of the air conduit 37 is positioned at a location above the open mouth 27 of the funnel 26 and, when arranged as generally shown in FIG. 4, the terminus 39 of the air conduit 37 is placed at a location a distance below the outlet 31 from the cooking oil conduit 29. In this manner, the terminus 39 of the air conduit 37 will be operably positioned in the area within the plastic bottle 41 near the neck 44 of the plastic bottle 41 such that air may escape from the inside of the plastic bottle 41 without obstruction from cooking oils flowing through the cooking oil conduit 29, which, in turn serves to ensure that the flowing cooking oils make their way as rapidly as possible through the cooking oil conduit 29 and into the container 40.

As previously discussed, it is considered a critical aspect of the present invention that the funnel 26 is provided or otherwise formed within an implemented body orifice 13 of the monkey 12. As also previously discussed, such implementation of the funnel 26 serves the principle objects of the present invention to the extent that the implementation is simulative of ingestion or the like by the monkey 12 of the disposed cooking oil. To this end, it is contemplated that a cooking implement 46, as understood in light of the controlling express definition set forth further herein under the subheading "Express Definitions," will be supported in place about the open mouth 14 (or other implemented body orifice 13) of the monkey 12 in order that cooking oils may be drained from the cooking implement 46 into the funnel 26. While it is at least possible that in some implementations a user will simply hold the cooking implement 46 in place about the open mouth 14 of the monkey 12, it is noted that this may in fact discourage use of the present invention. As a result, the most preferred implementations of the article 10 for facilitating and encouraging proper disposal of cooking oils, as contemplated by the present invention, include at least some stabilizing means 21 for holding the cooking implement 46 in place about the open mouth 14 of the monkey 12.

As particularly shown in FIGS. 1, 2, 4 and 7, such stabilizing means 21 may, for example, comprise notches 22 disposed about the open mouth 14 of the monkey 12. As particularly shown in FIGS. 4 and 7, the provided notches 22 are sized, shaped and otherwise arranged to engage the edges of the supported cooking implement 46, thereby serving to hold the cooking implement 46 in place about the open mouth 14 of the monkey 12 while cooking oils drain from the cooking implement 46 and through the open mouth 14 of the monkey 12 and into the funnel 26 disposed therein. Likewise, as also particularly shown in FIGS. 1, 2, 4 and 7, such stabilizing means 21 may, for example, comprise the arrangement of other implemented "body parts" of the monkey 12, such as, for example, the depicted arrangement of the hands 23 of the monkey. As will be appreciated by those of ordinary skill in the art, in light of this exemplary description, the hands 23, feet or other provided body parts of the monkey 12 are shaped, positioned and otherwise arranged to grip or otherwise support at least a portion of the cooking implement 46, thereby serving, alone or in combination with other any other stabilizing means 21, to maintain the cooking implement 46 in place as desired. For example, it is noted that the open mouth 14 of the monkey 12 as depicted in FIG. 1 is formed in a shape more oblong than the shape in which the open mouth 14 of the monkey 12 as depicted in FIG. 2 is formed. In this manner, the shape of the open mouth 14 of the monkey 12 may be said to comprise such a stabilizing means 21. By way of further example, and as particularly shown in FIGS. 8 and 9, the shape of the open mouth 14 of the monkey 12 may cooperate, for example, with the provision of spaced teeth 51 of the monkey 12 for the provision of a multifaceted stabilizing means 21.

Figure 8:
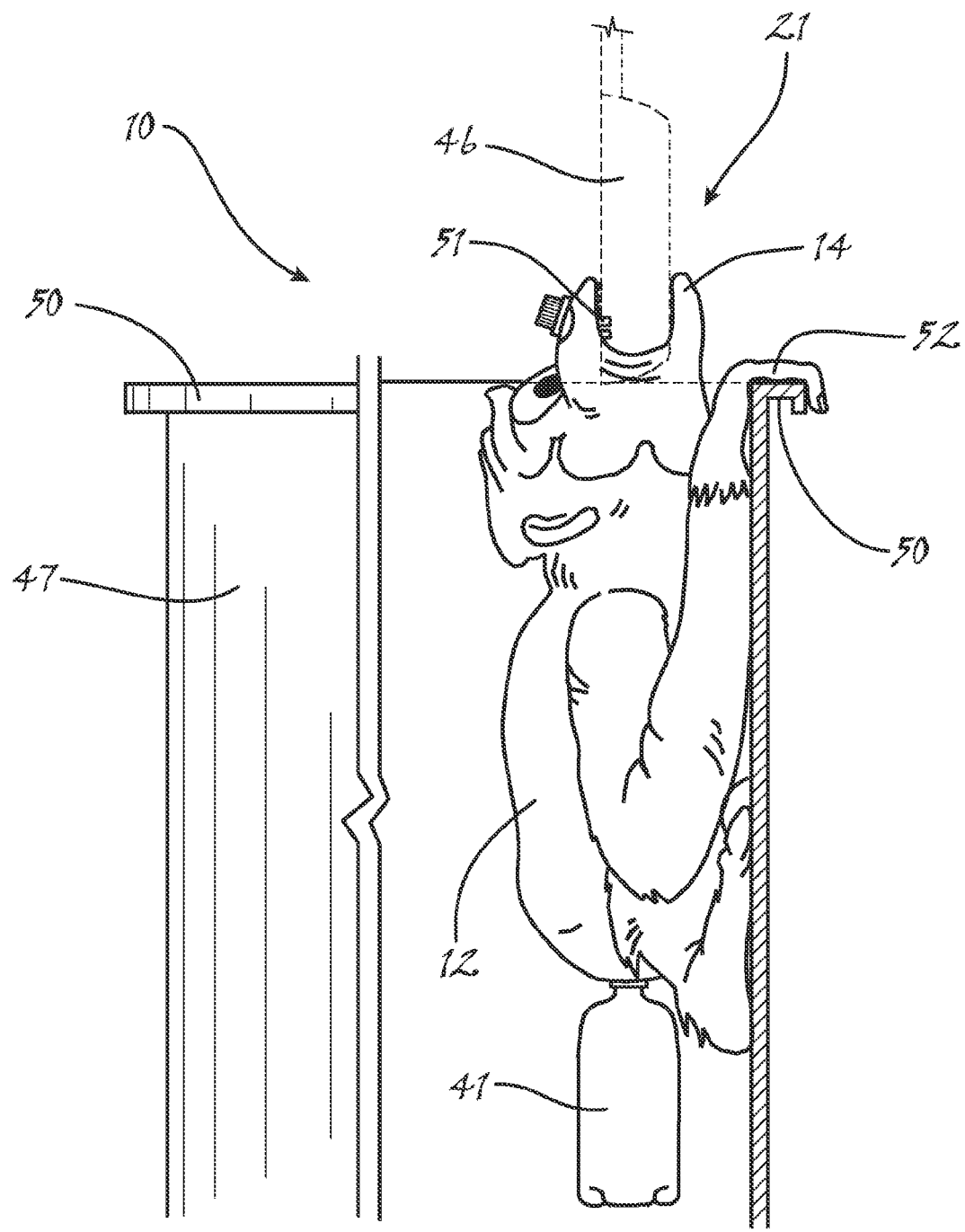
FIG. 8 shows, in a partially cutaway side elevational view generally corresponding to that of FIG. 3, a third exemplary implementation of the preferred embodiment of the article for facilitating and encouraging proper disposal of cooking oils of the present invention.
Figure 9:
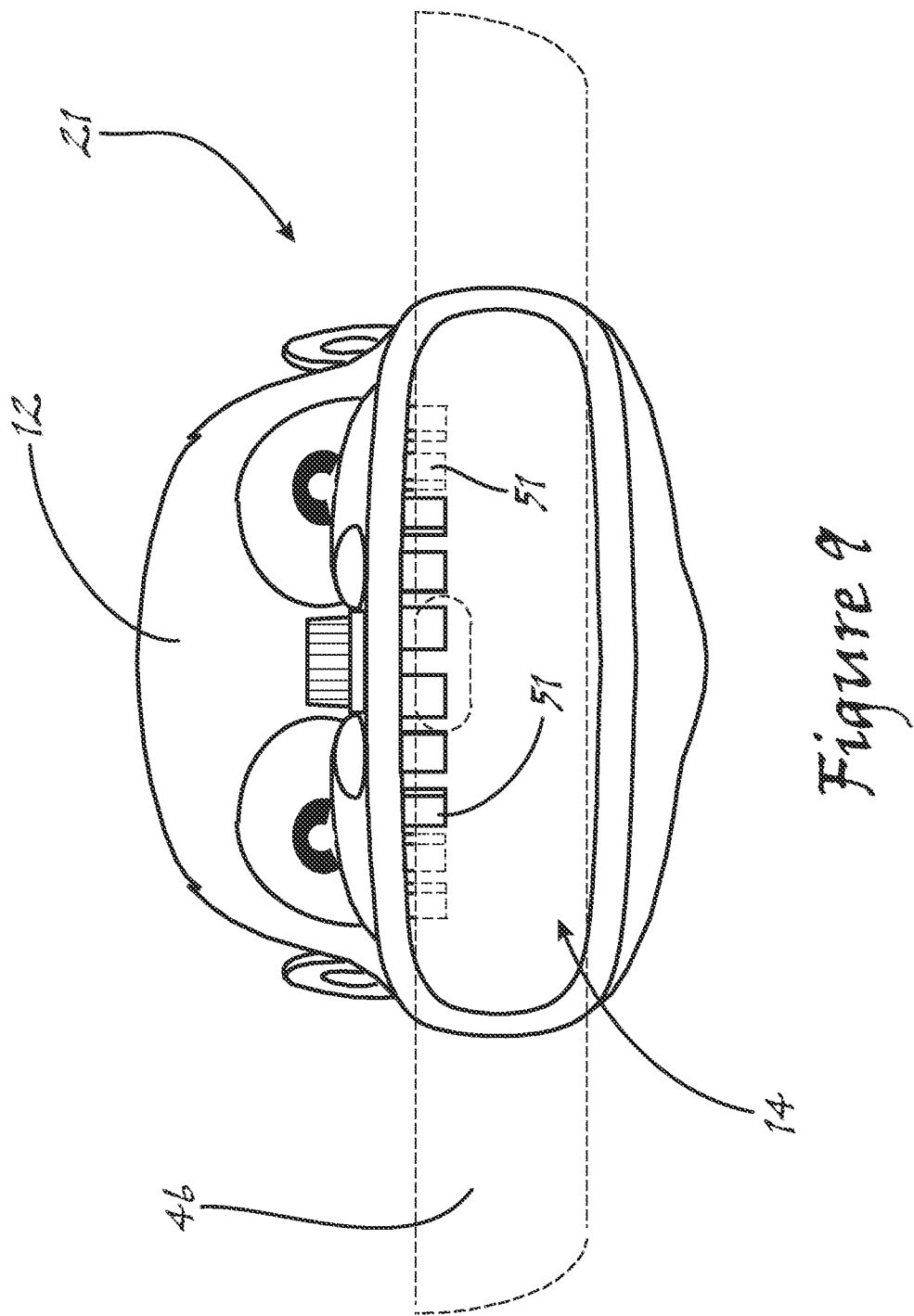
FIG. 9 shows, in a partially cutaway top plan view, details of the stabilizing means for holding a cooking implement as provided in the exemplary implementation of FIG. 8.

As previously mentioned, the aesthetic body 11 of the article 10 for facilitating and encouraging proper disposal of cooking oils of the present invention is provided with at least one mount 24 for attachment of the aesthetic body 11 to a portion of a waste receptacle 47. As particular shown in FIGS. 1 through 4 and 7, such a mount 24 may simply comprise one or more notches 25 formed in the aesthetic body 11 and sized, shaped and otherwise arranged to engage with the rim 50 about the opening to the interior space 48 of the waste receptacle 47. Likewise, such a mount 24 may be formed as an arrangement of the body parts of the monkey, such as, for example, a cupped hand 52 of the monkey 12 that, as particularly shown in FIG. 8, is sized, shaped and otherwise arranged to engage with the rim 50 about the opening to the interior space 48 of the waste receptacle 47, or, in the alternative, may comprise the provision of a clamp or like structure affixed to or integrally formed with the aesthetic body 11.

Finally, and still further contributing to the novelty of the present invention giving rise to the satisfaction of the principle objects of the present invention, Applicant has found that the nose 15 of the monkey 12 may be utilized as a convenient, as well as fun, storage location for the bottle cap 12 of the plastic bottle 41. To this end, Applicant contemplates that the nose 15 of the monkey 12 should be formed to include an externally threaded portion 16 having a thread pattern identical to that about the neck 44 of the plastic bottle 41. In this manner, the bottle cap 42 will be readily locatable when the container 40 is ready for removal and disposal.

In its preferred manner of use, the article 10 for facilitating and encouraging proper disposal of cooking oils, implemented as previously discussed in detail, is fitted with a container 40 and then affixed to a waste receptacle 47. Although the article 10 may be attached to the waste receptacle 47 with the fitted container 40 to the outside of the waste receptacle 47, the most preferred manner of use contemplates that the article 10 will be attached to the waste receptacle 47 with the fitted container 40 residing within the interior space 48 of the waste receptacle. In this manner, the waste receptacle will be less likely to inadvertently tip and, in the event that a leak should arise from the container 40 any such leak will be captured within the interior space 48 of the waste receptacle 47. In any case, with the article 10 operably affixed to a waste receptacle 47, a cooking implement 46 is positioned in place about the open mouth 14 (or other implemented orifice 13) of the monkey 12 and arranged, with the aid of any implemented stabilizing means 21, to allow cooking oils to drain from the cooking implement 46, through the funnel 26 and ultimately into the fitted container 40. When the cooking implement 46 has been substantially voided of cooking oils, the cooking implement 46 is removed for further conventional cleaning. Whenever the fitted container 40 becomes full, or periodically if desired, the fitted container 40 is detached from the article 10 for facilitating and encouraging proper disposal of cooking oils, the bottle cap 42 is retrieved from its storage location and used to seal the container 40 and the container is conventionally disposed according to known best practices.

Because, the article 10 for facilitating and encouraging proper disposal of cooking oils, implemented as herein discussed in detail, will inject a sense of fun and humor into the best practice process for proper disposal of cooking oils, the present invention will by its very appearance serve as an unmistakable reminder for a user to adhere to good practice. Additionally, the article 10 for facilitating and encouraging proper disposal of cooking oils, implemented as herein discussed in detail, will encourage such good practice by rewarding the user with pleasure in addition to providing satisfaction from bettering the environment while also improving the public health.

Express Definitions

Informed by and with the foregoing discussion clearly in mind, Applicant now expressly defines the following terms, and variants thereof, wherein the provided definitions are unequivocally intended to prevail over any and all other tenants of construction, including ordinary meaning and implied definition, and shall govern in the construction of the claims drawn hereto as well as in the further understanding of the foregoing disclosure:

Cooking Implement. The term "cooking implement" is expressly defined to refer to and include all manner of frying pans, skillets, sauce pots and the like such as are suitable for cooking or otherwise preparing foods using heated cooking oils.

Monkey. The term "monkey" is expressly defined to refer to and include all Primates of the infraorder Simiiformes, without regard to whether the commonly used name for any such Primate is or includes the term monkey (as opposed, for example, to gorilla, chimpanzee or the like, which are included within this definition of the term "monkey"), with the exception of any Primate in the genus Homo, commonly referred to as humans, any such Primates in the genus Homo being expressly excluded from this definition of the term "monkey."

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will readily recognize that the article 10 for facilitating and encouraging proper disposal of cooking oils may be manufactured utilizing any of a variety of well known processes and from any of a variety of suitable materials, including, for example, molding of plastics.

Likewise, however, those of ordinary skill in the art will readily recognize that regardless of process or material used in manufacturing, the resulting article should be manufactured of a material such as polypropylene or other like plastics capable of withstanding exposure to moderately elevated temperatures, such as may be expected in the use as described of the present invention. In any case, because the scope of the present invention is much broader than any particular embodiment, the foregoing detailed description should not be construed as a limitation of the scope of the present invention, which is limited only by the claims appended hereto.

What is claimed is:
1. An article for facilitating and encouraging proper disposal of cooking oils, said article comprising:
an aesthetic body shaped to have the appearance of at least a portion of a monkey, said aesthetic body comprising:
an interior space;
at least one body orifice, said at least one body orifice including at least an open mouth of the monkey; and a mount adapted to attach said aesthetic body to a portion of a waste receptacle;

a funnel having an open mouth and a stem, said funnel being disposed substantially within the open mouth of the monkey;

a cooking oil conduit attached at a first end thereof to said stem of said funnel and provided at a second end thereof with internal threading, said cooking oil conduit being disposed substantially within said interior space of said aesthetic body and said internal threading being sized and shaped to accept and dependently support a container adapted to collect cooking oil passed through said cooking oil conduit;

the article being adapted to hold a cooking implement in place about said open mouth of the monkey; and further comprising at least one of:

an additional body orifice at an anus of the monkey, said second end of said cooking oil conduit being terminated at said anus of the monkey;

said second end of said cooking oil conduit being terminated at a location within said interior space of said aesthetic body, wherein said interior space of said aesthetic body is sized and shaped to accept at least a portion of a container dependently supported from said second end of said cooking oil conduit, and said aesthetic body comprises an opening to said interior space, said opening to said interior space being adapted to receive therethrough said portion of a container;

notches formed about said open mouth of the monkey and being adapted to hold a cooking implement in place about said open mouth of the monkey;

hands of the monkey formed in said aesthetic body and being adapted to hold a cooking implement in place about said open mouth of the monkey;

an air conduit running from a first location above said mouth of said funnel to a second location below said second end of said cooking oil conduit;

said mount comprising at least one notch formed in a portion of said aesthetic body; or said mount comprising at least one cupped hand of the monkey formed in a portion of said aesthetic body.

2. The article for facilitating and encouraging proper disposal of cooking oils as recited in claim 1, wherein:

said at least one body orifice comprises at least an anus of the monkey; and said second end of said cooking oil conduit terminates at said anus of the monkey.

3. The article for facilitating and encouraging proper disposal of cooking oils as recited in claim 2, said article further comprising notches formed about said open mouth of the monkey, said notches being adapted to hold a cooking implement in place about said open mouth of the monkey.

4. The article for facilitating and encouraging proper disposal of cooking oils as recited in claim 2, said article further comprising hands of the monkey formed in said aesthetic body, said hands of the monkey being adapted to hold a cooking implement in place about said open mouth of the monkey.

5. The article for facilitating and encouraging proper disposal of cooking oils as recited in claim 2, said article further comprising an air conduit running from a first location above said mouth of said funnel to a second location below said second end of said cooking oil conduit.

6. The article for facilitating and encouraging proper disposal of cooking oils as recited in claim 2, said article further comprising a solids screen adapted to be received within said funnel.

7. The article for facilitating and encouraging proper disposal of cooking oils as recited in claim 6, said article further comprising an air conduit running from a first location about said mouth of said funnel to a second location below said second end of said cooking oil conduit.

8. The article for facilitating and encouraging proper disposal of cooking oils as recited in claim 7, wherein said solids screen and said air conduit are unitarily formed.

9. The article for facilitating and encouraging proper disposal of cooking oils as recited in claim 2, wherein said mount adapted to attach said aesthetic body to a portion of a waste receptacle comprises at least one notch formed in a portion of said aesthetic body.

10. The article for facilitating and encouraging proper disposal of cooking oils as recited in claim 2, wherein said mount adapted to attach said aesthetic body to a portion of a waste receptacle comprises at least one cupped hand of the monkey formed in a portion of said aesthetic body.

11. The article for facilitating and encouraging proper disposal of cooking oils as recited in claim 1, wherein:

said second end of said cooking oil conduit terminates at a location within said interior space of said aesthetic body; and said interior space of said aesthetic body is sized and shaped to accept at least a portion of a container dependently supported from said second end of said cooking oil conduit.

12. The article for facilitating and encouraging proper disposal of cooking oils as recited in claim 11, wherein said aesthetic body comprises an opening to said interior space, said opening to said interior space being adapted to receive therethrough said portion of a container.

13. The article for facilitating and encouraging proper disposal of cooking oils as recited in claim 11, said article further comprising notches formed about said open mouth of the monkey, said notches being adapted to hold a cooking implement in place about said open mouth of the monkey.

14. The article for facilitating and encouraging proper disposal of cooking oils as recited in claim 11, said article further comprising hands of the monkey formed in said aesthetic body, said hands of the monkey being adapted to hold a cooking implement in place about said open mouth of the monkey.

15. The article for facilitating and encouraging proper disposal of cooking oils as recited in claim 11, said article further comprising an air conduit running from a first location above said mouth of said funnel to a second location below said second end of said cooking oil conduit.

16. The article for facilitating and encouraging proper disposal of cooking oils as recited in claim 11, said article further comprising a solids screen adapted to be received within said funnel.

17. The article for facilitating and encouraging proper disposal of cooking oils as recited in claim 16, said article further comprising an air conduit running from a first location about said mouth of said funnel to a second location below said second end of said cooking oil conduit.

18. The article for facilitating and encouraging proper disposal of cooking oils as recited in claim 17, wherein said solids screen and said air conduit are unitarily formed.

19. The article for facilitating and encouraging proper disposal of cooking oils as recited in claim 11, wherein said mount adapted to attach said aesthetic body to a portion of a waste receptacle comprises at least one notch formed in a portion of said aesthetic body.

20. The article for facilitating and encouraging proper disposal of cooking oils as recited in claim 11, wherein said mount adapted to attach said aesthetic body to a portion of a waste receptacle comprises at least one cupped hand of the monkey formed in a portion of said aesthetic body.

\* \* \* \* \*